Figure 1:
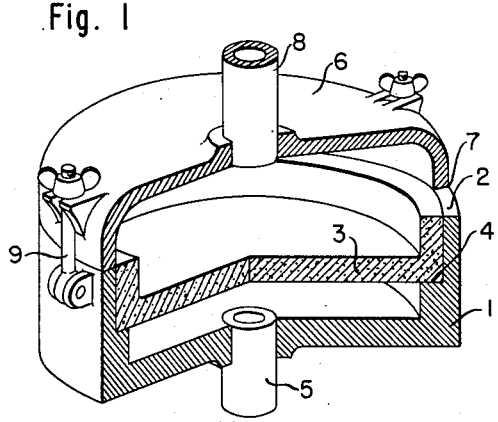

March 15, 1955  A. E. USHAKOFF  2,704,238

PROCESS OF MAKING HOLLOW LEATHER ARTICLES

Filed June 27, 1951

*INVENTOR.*
ALEXIS E. USHAKOFF

BY

ATTORNEYS

United States Patent Office 2,704,238
Patented Mar. 15, 1955

2,704,238

PROCESS OF MAKING HOLLOW LEATHER ARTICLES

Alexis E. Ushakoff, Beverly, Mass., assignor to Secotan, Inc., Somerville, Mass., a corporation of Massachusetts Application June 27, 1951, Serial No. 233,923

19 Claims. (Cl. 8—150.5)

This invention relates to the tanning of skins and comprises a novel process of making hollow articles of leather, such as seamless shoe uppers, leather piston skirt washers, handbags, and the like, directly from untanned skins.

The copending application of the present inventor Serial No. 119,054, filed October 1, 1949, now U. S. Patent No. 2,582,298, discloses a process of making seamless hollow leather articles by conforming a wet skin to a concave mold and tanning it in the mold or in or out of the mold after dehydrating it in the mold. The present invention is directed specifically to the process wherein the skin is dehydrated in the mold and thereafter removed from the mold and tanned. This application continues-in-part divisional matter from the above-identified application.

According to the present invention hollow articles of leather are produced by molding a wet untanned skin to an appropriate mold, then dehydrating the skin while it is maintained in conformity to the mold. Thereafter the skin is removed from the mold and subsequently tanned under non-aqueous conditions. This invention is based principally on the discovery that the dehydrated skin may be removed from the mold, and will still retain its molded form, provided it is not rewet with water before it is tanned, and may further be tanned under non-aqueous conditions without impairment of form. Thus, one feature of this invention is that after the skin is dehydrated, and before it is tanned, all operations are performed under essentially non-aqueous conditions, conveniently in the presence of organic solvents. It is noteworthy that whereas a hydrated skin possesses a deformable plastic structure, which may readily be stretched and pulled to conform to a mold, a dehydrated skin, although saturated with organic solvent and being flexible and soft, is not plastic, and will retain its inherent form.

An important advantage of the process of this invention is that more skins may be processed on each mold because of the shorter period of time each skin remains on the mold. Another advantage is that prior to tanning, both sides of the skin are made accessible and may be inspected for defects that would otherwise be obscured by the mold. Defective skins may be discarded without tanning them, resulting in a saving of tanning agents. If desired, both surfaces may also be given such preliminary treatment as tooling, dyeing or sueding before the skin is tanned, and the subsequent tanning process will serve to fix such treatment permanently into the leather structure.

In preferred embodiments of this invention a blank of wet skin that has been pickled or bated, and which is therefore plastic and limp, but not substantially swollen, is forced into conformity with a concave mold of the desired shape and having a depth substantially in excess of the thickness of the skin. If the mold is constructed of a porous material and is readily permeable to air and liquids, the margin of the blank may be secured about the periphery of the mold, and a vacuum applied through the mold to the under side of the blank to cause it to be pressed by atmospheric pressure into conformity to the mold. Alternatively a fluid pressure may be applied to the outside surface of the skin to achieve the same result.

After the skin has been thus molded a dehydrating liquid is forced through it to extract the water therefrom, leaving the skin soft and flexible and with an open porous structure. The dehydrating liquid may be drawn through the skin by means of a vacuum applied to the mold side, or it may be forced through the skin under an applied fluid pressure. Conveniently the fluid pressure of the dehydrating liquid is also used to conform the skin to the mold, the hydrated wet skin being sufficiently impervious to the dehydrating liquid to allow it to yield to the fluid pressure. Thereafter the skin is removed from the mold, given any desired preliminary treatment, and finally tanned under non-aqueous conditions. If desired, the skin may be dried prior to tanning, and it will then closely resemble, in texture and appearance, the tanned leather article.

Alternatively the process of this invention may be carried out with a convex mold, which may be necessary if the desired form is complex and not well adapted to concave molding. Such a mold may be hollow and porous, so that the dehydrating liquid may be forced through the skin, or it may be impervious, in which case dehydration may be effected by immersing the molded skin in the dehydrating liquid or simply by drying the skin.

Dehydrating liquids are preferably organic water-miscible solvents, such as the lower aliphatic alcohols and ketones, although other liquids which will extract water without attacking the skin protein may be used satisfactorily. As non-aqueous tanning baths solutions of metallic tanning salts or organic tanning agents in organic solvents, such as methanol, are suitable. Gaseous tanning agents, such as formaldehyde, may also be used.

As the term is used herein, a dehydrated skin is one in which the moisture content is less than about 10% by weight, not necessarily a bone dry skin. A skin having less than 10% moisture has been found sufficiently dry to maintain its molded shape, as described above, while a skin with more than this amount of moisture is less able to resist deformation. Accordingly the advantages of this invention are best realized if after dehydration and before tanning the moisture content is maintained below 10%, but the presence of slightly more moisture may be tolerable if a slight amount of distortion is not objectionable. Also, small amounts of water in the tanning bath are tolerable, provided there is not so much water present as will allow the skin to become hydrated to an extent greater than 10% before the skin is sufficiently tanned to maintain its form when wet. It has been found that as much as 3% by weight of water in the non-aqueous tanning agent is generally not objectionable.

Figure 2:
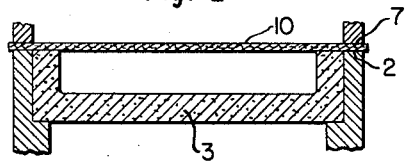
Figure 3:
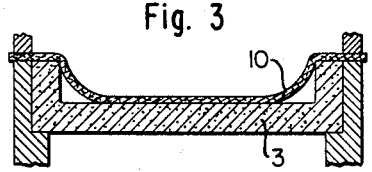
Figure 4:
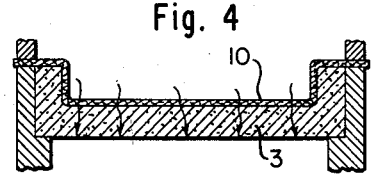
Figure 5:
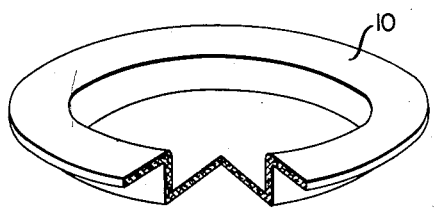
Figure 7:
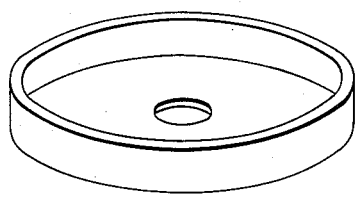
Figure 6:
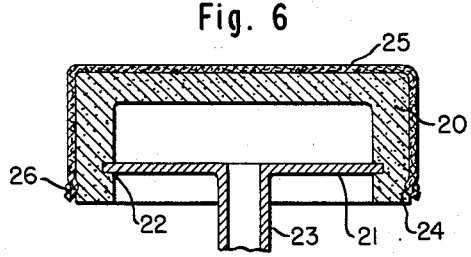

Representative preferred embodiments of this invention as utilized in the manufacture of pump piston skirt washers, selected for purposes of illustration, are described in detail below and shown in the accompanying drawings in which:

Fig. 1 is a perspective view partly broken away to reveal structural details of one preferred device in which a skin may be conformed to a mold and dehydrated, Figs. 2, 3 and 4 are fragmentary cross sectional views showing successive stages of a skin being conformed to a mold and dehydrated, Fig. 5 is a perspective view, partly in cross section, showing the skin after molding and dehydrating, Fig. 6 shows in cross sectional elevation an alternative device for molding and dehydrating a skin, and Fig. 7 is a perspective view of the molded and dehydrated article trimmed to final form and tanned.

An appropriate molding apparatus, shown in Fig. 1, consists of a casing 1 having a flat peripheral edge 2. A mold 3 of porous material such as plaster of Paris, is contained therein, the bottom marginal edge conveniently resting on a shoulder 4 appropriately situated within the casing 1. The upper surfaces of the mold 3 conform accurately to the desired shape of the piston washer. A discharge tube 5 connection is tapped into the bottom of the casing at any convenient location.

Cooperating with the casing is a cover 6 having a corresponding mating peripheral edge 7. The central portion of the cover is domed and tapped with an inlet connection 8. Screw clamps 9 are conveniently provided to secure the cover 6 to the casing 1. The peripheral edges 2 and 7 of the casing and cover provide means for clamping the margins of a skin blank above the mold 3 prior to the molding operation.

To produce a piston washer by the process of this invention, a disk 10 of wet pickled or bated skin is placed over the mold 3 with its marginal edges overlying the peripheral edge 2 of the casing. The cover is then placed over the skin, mold and casing with its peripheral edge 7 cooperating with the edge 2 of the casing to hold the marginal edge of the blank 10. The cover is clamped in place.

A vacuum is now applied to the outlet tube 5, thus causing the skin to be drawn into the mold 3 and into close conformity therewith as suggested by Figs. 2, 3 and 4. Alternatively, air under pressure may be supplied to the inlet tube 8 to achieve the same result. A dehydrating liquid is next supplied through the inlet tube and forced through the skin, to extract substantially all the water as suggested by Fig. 4. If acetone is used as the dehydrating liquid, the skin is sufficiently dry when the effluent acetone water solution is of a density less than .810 (20° C.). The dehydrating liquid may be supplied to the inlet 8 under pressure, or it may be poured into the inlet 8 and a vacuum applied to the outlet 5 to cause the dehydrating liquid to permeate the skin 10. Another alternative is to pour the dehydrating liquid into the inlet 8 and then apply air pressure to force it through the skin. Or, if desired, the dehydrating liquid may be introduced above the unconformed skin under pressure to both conform the skin to the mold and dehydrate it.

Initially the wet skin offers considerable resistance to the dehydrating liquid, but as the moisture content becomes reduced the resistance falls sharply and the dehydrating liquid begins to flow through very readily.

The dehydrated skin is now removed from the mold and will be seen to have a hat-shaped form, as shown in Fig. 5. It may now be inspected for defects and given any preliminary treatment necessary. Conveniently the outwardly extending rim may be trimmed and the center punched to accommodate the pump piston rod. The final step is to tan the skin and this may be done by immersing it in a non-aqueous tanning bath such as a chromic chloride in methanol and acetone solution, and drying the skin. One preferred tanning solution is prepared as follows:

100 cc. of a saturated $CrCl_3$ in methanol solution is mixed with 500 cc. of acetone. A saturated solution of ammonia in water is added to this mixture to the point of incipient precipitation.

The finished article is shown in Fig. 7.

An alternative technique utilizes a convex mold such as that shown in Fig. 6. The mold consists of a cup 20 of porous ceramic, such as plaster of Paris, the outside surface accurately conforming to the desired shape of the piston cup. The marginal edges of a disk 21 of metal are encased in the lower inner side walls 22 of the mold. A tube 23 extends through the center of the disk and communicates with the hollow interior of the mold. An annular groove 24 extends around the lower outside rim of the mold.

A disk-shaped blank 25 of wet skin is manually conformed to the mold 20 and retained thereon by a split-ring shaped spring 26 which cooperates with annular groove 24. A vacuum is applied to the tube 23 and the mold and skin are immersed in a dehydrating liquid, which is drawn through the skin and mold thus dehydrating the skin. The skin may now be removed from the mold and inspected, trimmed, center punched and tanned as explained above.

Heretofore piston washers of the type described were made by saturating a blank of vegetable tanned skin with water and forming it to a concave mold, then carefully drying the blank in the mold. Chrome tanned skins could not be used because they could not be rendered adequately plastic by wetting them. It will accordingly be seen that in this commodity alone the process of this invention greatly facilitates production and makes it possible to produce piston cups of the superior more resistant chrome tanned leather.

Having thus disclosed my invention and described in detail preferred embodiments thereof I claim and desire to secure by Letters Patent:

1. A method of forming hollow leather articles comprising the steps of distending an untanned water-wet skin into a hollow form having a depth substantially in excess of the thickness of the skin, contacting the skin with an inert water-miscible organic solvent while the skin is maintained in its distended hollow form, to extract water from the skin and thereby dehydrate the skin, the amount of solvent and time of treatment being such as to dehydrate the skin sufficiently to retain its form free of external form-maintaining forces, freeing the skin of all external form maintaining forces, and tanning the skin in a substantially non-aqueous tanning medium.

2. A method of forming hollow leather articles comprising the steps of distending an untanned water-wet skin into a hollow form having a depth substantially in excess of the thickness of the skin, contacting the skin with an inert water-miscible organic solvent while the skin is maintained in its distended hollow form to extract water from the skin and thereby dehydrate the skin, the amount of solvent and time of treatment being such as to reduce the water content of the skin to less than about 10% by weight, freeing the skin of all external form maintaining forces, and tanning the skin in a substantially non-aqueous tanning medium.

3. A method of forming hollow leather articles comprising the steps of distending an untanned water-wet skin into a hollow form having a depth substantially in excess of the thickness of the skin, contacting the skin with an inert water-miscible organic solvent while the skin is maintained in its distended hollow form to extract water from the skin and thereby dehydrate the skin, the amount of solvent and time of treatment being such as to dehydrate the skin sufficiently to retain its form free of external form-maintaining forces, freeing the skin of all external form maintaining forces, and tanning the skin in a substantially non-aqueous organic solvent solution of a tanning agent.

4. A method of forming hollow leather articles comprising the steps of distending an untanned water-wet skin into a hollow form having a depth substantially in excess of the thickness of the skin, forcing an inert water-miscible organic solvent through the skin while the skin is maintained in the distended hollow form to extract water from the skin and thereby dehydrate the skin, the amount of solvent and time of treatment being such as to dehydrate the skin sufficiently to retain its form free of external form-maintaining forces, freeing the skin of all external form-maintaining forces, and finally tanning the skin under substantially non-aqueous conditions.

5. A method of forming hollow leather articles comprising the steps of distending an untanned water-wet skin into a hollow form having a depth substantially in excess of the thickness of the skin, forcing an inert water-miscible organic solvent through the skin while the skin is maintained in the distended hollow form to extract water from the skin and thereby dehydrate the skin, the amount of solvent and time of treatment being such as to reduce the water content of the skin to less than about 10% by weight, freeing the skin of all external form-maintaining forces, and finally tanning the skin under substantially non-aqueous conditions.

6. A method of forming hollow leather articles comprising the steps of distending an untanned water-wet skin into a hollow form having a depth substantially in excess of the thickness of the skin, forcing an inert water-miscible organic solvent through the skin while the skin is maintained in the distended hollow form to extract water from the skin and thereby dehydrating the skin, the amount of solvent and time of treatment being such as to dehydrate the skin sufficiently to retain its form free of external form-maintaining forces, freeing the skin of all external form-maintaining forces, and finally tanning the skin under substantially non-aqueous conditions in an organic solvent solution of a tanning agent.

7. A method of forming hollow leather articles comprising the steps of distending an untanned water-wet skin into conformity with the surface of a hollow concave mold having a depth substantially in excess of the thickness of the skin, contacting the skin with an inert water miscible organic solvent while the skin is supported in the mold to extract water from the skin and thereby dehydrate the skin, the amount of solvent and time of treatment being such as to dehydrate the skin sufficiently to retain its form free of the mold, removing the skin from the mold, and tanning the skin in a substantially non-aqueous tanning medium.

8. A method of forming hollow leather articles comprising the steps of securing the marginal edges of an untanned water-wet skin about the periphery of a concave mold having a depth substantially in excess of the thickness of the skin, distending the unconfined area of the skin into conformity with said mold by fluid pressure, forcing on inert water-miscible organic solvent through the skin while the skin is supported in the mold to extract water from the skin and thereby dehydrate the skin, the amount of solvent and time of treatment being such as to reduce the water content to less than about 10% by weight, removing the skin from the mold, and tanning the skin in a substantially non-aqueous tanning medium.

9. A method of forming hollow leather articles comprising the steps of securing the marginal edges of an untanned water-wet skin about the periphery of a concave mold having a depth substantially in excess of the thickness of the skin, distending the unconfined area of the skin into conformity with said mold by the fluid pressure of an inert water-miscible organic solvent, forcing the solvent through the skin while the skin is supported in the mold to extract water from the skin and thereby dehydrate the skin, the amount of solvent and time of treatment being such as to dehydrate the skin sufficiently to retain its form free of the mold, removing the skin from the mold, and tanning the skin in a substantially non-aqueous organic solvent solution of a tanning agent.

10. A method of forming hollow leather articles comprising the steps of distending an untanned water-wet skin into a hollow form having a depth substantially in excess of the thickness of the skin, contacting the skin with acetone while the skin is maintained in its distended hollow form to extract water from the skin and thereby dehydrate the skin, the amount of acetone and time of treatment being such as to dehydrate the skin sufficiently to retain its form free of external form-maintaining forces, freeing the skin of all external form maintaining forces, and tanning the skin in a substantially non-aqueous tanning medium.

11. A method of forming hollow leather articles comprising the steps of distending an untanned water-wet skin into a hollow form having a depth substantially in excess of the thickness of the skin, contacting the skin with acetone while the skin is maintained in its distended hollow form to extract water from the skin and thereby dehydrate the skin, the amount of acetone and time of treatment being such as to dehydrate the skin sufficiently to retain its form free of external form-maintaining forces, freeing the skin of all external form maintaining forces, and tanning the skin in a substantially non-aqueous organic solvent solution of a tanning agent.

12. A method of forming hollow leather articles comprising the steps of distending an untanned water-wet skin into a hollow form having a depth substantially in excess of the thickness of the skin, forcing acetone through the skin while the skin is maintained in the distended hollow form to extract water from the skin and thereby dehydrate the skin, the amount of acetone and time of treatment being such as to dehydrate the skin sufficiently to retain its form free of external form-maintaining forces, freeing the skin of all external form-maintaining forces, and finally tanning the skin under substantially non-aqueous conditions.

13. A method of forming hollow leather articles comprising the steps of distending an untanned water-wet skin into a hollow form having a depth substantially in excess of the thickness of the skin, forcing acetone through the skin while the skin is maintained in the distended hollow form to extract water from the skin and thereby dehydrate the skin, the amount of acetone and time of treatment being such as to dehydrate the skin sufficiently to retain its form free of external form-maintaining forces, freeing the skin of all external form-maintaining forces, and finally tanning the skin under substantially non-aqueous conditions in an organic solvent solution of a tanning agent.

14. A method of forming hollow leather articles comprising the steps of securing the marginal edges of an untanned water-wet skin about the periphery of a concave mold having a depth substantially in excess of the thickness of the skin, distending the unconfined area of the skin into conformity with said mold by the fluid pressure of acetone, forcing the acetone through the skin while the skin is supported in the fold and removing the acetone-water mixture from the skin thereby dehydrating the skin, the amount of acetone and time of treatment being such as to dehydrate the skin sufficiently to retain its form free of the mold, removing the skin from the mold, and tanning the skin in a substantially non-aqueous organic solvent solution of a tanning agent.

15. A method of forming hollow leather articles comprising the steps of distending an untanned water-wet skin into a hollow form having a depth substantially in excess of the thickness of the skin, contacting the skin with acetone while the skin is maintained in its distended hollow form to extract water from the skin, the amount of acetone and time of treatment being such that the acetone-water mixture in equilibrium with the skin is brought to have a specific gravity of less than 0.810 (20° C.), freeing the skin of all external form maintaining forces, and tanning the skin in a substantially non-aqueous tanning medium.

16. A method of forming hollow leather articles comprising the steps of distending an untanned water-wet skin into a hollow form having a depth substantially in excess of the thickness of the skin, contacting the skin with acetone while the skin is maintained in its distended hollow form to extract water from the skin, the amount of acetone and time of treatment being such that the acetone-water mixture in equilibrium with the skin is brought to have a specific gravity of less than 0.810 (20° C.), freeing the skin of all external form maintaining forces, and tanning the skin in a substantially non-aqueous organic solvent solution of a tanning agent.

17. A method of forming hollow leather articles comprising the steps of distending an untanned water-wet skin into a hollow form having a depth substantially in excess of the thickness of the skin, forcing acetone through the skin while the skin is maintained in the distended hollow form to extract water from the skin, the amount of acetone and time of treatment being such that the acetone-water mixture in equilibrium with the skin is brought to have a specific gravity of less than 0.810 (20° C.), freeing the skin of all external form-maintaining forces, and finally tanning the skin under substantially non-aqueous conditions.

18. A method of forming hollow leather articles comprising the steps of distending an untanned water-wet skin into a hollow form having a depth substantially in excess of the thickness of the skin, forcing acetone through the skin while the skin is maintained in the distended hollow form to extract water from the skin, the amount of acetone and time of treatment being such that the acetone-water mixture in equilibrium with the skin is brought to have a specific gravity of less than 0.810 (20° C.), freeing the skin of all external form-maintaining forces, and finally tanning the skin under substantially non-aqueous conditions in an organic solvent solution of a tanning agent.

19. A method of forming hollow leather articles comprising the steps of securing the marginal edges of an untanned water-wet skin about the periphery of a concave mold having a depth substantially in excess of the thickness of the skin, distending the unconfined area of the skin into conformity with said mold by the fluid pressure of acetone, forcing the acetone through the skin while the skin is supported in the mold to extract water from the skin, the amount of acetone and time of treatment being such that the acetone-water mixture in equilibrium with the skin is brought to have a specific gravity of less than 0.810 (20° C.), removing the skin from the mold, and tanning the skin in a substantially non-aqueous organic solvent solution of a tanning agent.

References Cited in the file of this patent

UNITED STATES PATENTS

| 1,592,722 | Carter | July 13, 1926 |
| 2,017,453 | Bell | Oct. 15, 1935 |
| 2,123,552 | Helwig | July 12, 1938 |
| 2,582,298 | Ushakoff | Jan. 15, 1952 |

FOREIGN PATENTS

| 2,247/02 | Great Britain | June 25, 1902 |
| 565,065 | Great Britain | Oct. 25, 1944 |

OTHER REFERENCES

"Progress in Leather Science 1920–1945," page 490, publ. 1948, by B.L.M.R.A., London, England.